United States Patent [19]
Gandar

[11] Patent Number: 5,907,557
[45] Date of Patent: May 25, 1999

[54] INDUSTRIAL OR DOMESTIC LOCAL NETWORK

[76] Inventor: Marc Gandar, 24, avenue des Communes-Réunies CH-1212, Grand-Lancy, Switzerland

[21] Appl. No.: 08/793,394

[22] PCT Filed: Aug. 28, 1995

[86] PCT No.: PCT/FR95/01127

§ 371 Date: May 8, 1997

§ 102(e) Date: May 8, 1997

[87] PCT Pub. No.: WO96/07259

PCT Pub. Date: Mar. 7, 1996

[30] Foreign Application Priority Data

Aug. 31, 1994 [FR] France ................................. 94/10632

[51] Int. Cl.$^6$ ........................................ H04J 3/24
[52] U.S. Cl. .................... 370/475; 370/442; 370/443; 370/459
[58] Field of Search .................... 370/347, 348, 370/349, 442, 443, 459, 475; 340/825.5, 825.08

[56] References Cited

FOREIGN PATENT DOCUMENTS

A0192 305  8/1986  European Pat. Off. .

OTHER PUBLICATIONS

Control Engineering, Sep. 1991, pp. 65–67, J.P. thomasse, P. Lorenz, J.P. Bardinet, P. Leterrer, T. Valentin. 'Factory Instrumentation Protocol: Model, Products, and tools.'.

Primary Examiner—Jeffery A. Hofsass
Assistant Examiner—Clement Townsend
Attorney, Agent, or Firm—Arthur L. Plevy, Esq.; Greenbaum, Rowe, Smith, Ravin, Davis & Himmel, LLP

[57] ABSTRACT

The present invention relates to a method for exchanging information frames over a network between circuits having transmission channels of unified addresses and/or reception channels associated with addresses of transmission channels. It includes the steps of periodically transmitting from a master circuit addresses of transmission channels; receiving each address by each circuit and, when the address corresponds to a transmission channel of the circuit, transmitting the information frame contained in the transmission channel after receiving the next address; receiving each information frame by each circuit and, when the address previously received by the circuit is associated with a reception channel of the circuit, providing the received frame to this reception channel after receiving the next address; and retransmitting from each circuit each first address received and each first information frame received.

9 Claims, 7 Drawing Sheets

INDUSTRIAL OR DOMESTIC LOCAL NETWORK

The present invention relates to an industrial or domestic-type local network, for controlling and/or monitoring several appliances by means of one or several distributed (or delocalized) computers.

The I2C bus is an example of such a network. The I2C bus is inexpensive but its length is limited to a few meters and only enables to control a limited number of appliances. Moreover, the information rate on this bus is particularly low (100 kbits/s), which limits its use to transferring simple commands, of the on/off type, or digital variables which change slowly. Transferring commands takes-up a non-negligible part of the processing power of the computer which manages the network.

FIG. 1 shows an example of FIP network, which is a more efficient network than the I2C bus. This network includes a set of circuits, or nodes, M and N1 to N3 connected to a common bus. Circuit M is a master circuit which manages the information exchanges between nodes N1 to N3. The exchanges are performed by means of a so-called "subscriber" mechanism. Each node N includes at least one consumer subscriber (receiver) R and at least one generator subscriber (transmitter) T. Each generator subscriber has a single address. Each consumer subscriber is mat to receive the information transmitted by a single generator subscriber which is associated by the user with the consumer subscriber by a programming of the nodes.

In the example of FIG. 1, nodes N1 to N3 include generator subscribers T with respective addresses 1 to 3. The consumer subscribers of nodes N1 to N3 are respectively associated with the generator subscribers having as respective addresses 2, 1 and 2. Thus, one-way or two-way logic links, shown in dotted lines, are established between the various network nodes.

The generator subscribers T are successively questioned by master circuit M, the questioning consisting, for example, in the transmission by the master circuit of the addresses of these generator subscribers. For each questioning, the corresponding generator subscriber recognizes its address and transmits its content, while the associated consumer subscribers also recognize the address and prepare to receive this content.

A FIP network is particularly reliable in that a consumer subscriber only receives information from the associated generator subscriber and thus cannot receive spurious commands from a node connected by mistake or malevolence to the network However, a disadvantage of a FIP network is that it becomes inoperable when the bus is accidentally broken.

FIG. 2 illustrates a so-called "flooding" technique enabling a network to operate even if connections between nodes are broken. Nodes N1 to N5 of this network are interconnected by point-to-point links. Each node is likely to be connected to several other nodes by point-to-point links, not all possibilities being necessarily used. Thus, for example, node N3 is connected to nodes N1, N2, N4, and N5; node N1 being also connected to node N4. Each node is provided to repeat on each of its point-to-point links an information that it receives for the first time on one of its links, which is shown by an arrow from node N1 towards node N3 and by four arrows originating from node N3. It is thus ensured that each node of the network receives each information at least once. A node can even receive the same information several times. Thus, node N1 transmits an information which simultaneously arrives onto nodes M3 and N4. Little after, node N3 repeats this information which is again received by node N4. The nodes in the network are thus provided to take an information into account (to repeat it and, in case of need, process it) only upon its first arrival.

Thus, each node can receive a same information several times through different paths. If one of the paths is accidentally broken, the node receives the information through the remaining paths. For example, if the link between nodes N1 and N4 is broken, node N4 still receives the information from node N1 via node N3.

In the control and monitoring of appliances or of an installation, the need for real time transmission of images and sounds, in addition to the usual control and monitoring information, is becoming more and more frequent. Existing local networks do not allow the real time transmission of sound or images because, on the one hand, their rate is too low and, on the other hand, the information is transmitted asynchronously. For example, in a FIP network, the master circuit periodically transmits bursts of questions. Each first question of a burst is thus transmitted periodically. However, each other question of a burst is transmitted when the answer to the preceding question has been transmitted. Yet, the transmission time of an answer varies according to the occupation of the node which transmits the answer and to the random number of bits that it contains. Thus, the questions within a burst are transmitted in a non-periodical fashion. Besides, in a FIP network, a node takes a non-negligible time to answer a question since it has to perform a number of processings such as analyzing the question to recognize the address of a transmission mailbox and transmit the content of the mailbox into an output register. Meanwhile, the network is unused, which decreases its rate.

Of course, the lack of synchronism of the transfers of a network can be compensated in a one-way transmission by providing buffer memories at the node outputs and inputs. This would increase the cost of each node and does not solve the problem of the insufficient rate. Besides, this solution does not enable to compensate for the lack of synchronism in a two-way real time transmission (a conversation), since it introduces a transmission delay which increases with the size of the buffer memories.

SUMMARY OF THE INVENTION

An object of the present invention is to provide a local network, all nodes of which have a particularly low cost, while enabling the transmission of image and sound in addition to data transmission.

This object is achieved by a method for exchanging information frames having a constant length on a network between circuits having transmission channels of unified addresses and/or reception channels associated with addresses of transmission channels. It includes the steps of periodically transmitting from a master circuit addresses of transmission channels, so that the address of each transmission channel is periodically transmitted; receiving each address by each circuit and, when the address corresponds to a transmission channel of the circuit, transmitting the information frame contained in the transmission channel after receiving the next address; receiving each information frame by each circuit and, if the address previously received by the circuit is associated with a reception channel of the circuit, providing the received frame to this reception channel after receiving the next address; and retransmitting from each circuit each first address received and each first information frame received.

According to an embodiment of the present invention, each circuit, at the time when it should be receiving an address which does not arrive, when necessary, transmits the information frame contained in the transmission channel corresponding to the last address received, or provides the received frame to the reception channel associated with the last address received A transmitter circuit according to the present invention includes at least one transmission channel having an address such that the addresses of the transmission channels of the circuits connected to the network are unified; an input register for periodically receiving addresses transmitted over the network by a master circuit and frames transmitted over the network as answers to these addresses; an event flag set to a "question received" state at the time when an address is received in the input register; an output register receiving the content of the transmission 1 when the flag is in the "question received" state and the address contained in the input register is that of the transmission channel; and a trigger for transmitting the content of the output register, armed when the flag is set to the "question received" state and the address contained in the input register is that of the transmission channel, this trigger being fired and reset by a new setting of the flag to the "question received" state.

A receiver circuit according to the present invention includes at least one reception channel associated with an address of a transmission channel; an input register for periodically receiving addresses transmitted over the network by a master circuit and frames transmitted over the network as answers to these addresses; the reception channel connected to the input register for receiving the content of the input register when it is both selected and enabled; an event flag set to a "question received" state at the time when an address is received in the input register, set to an "answer received" state at the time when a frame is received in the input register, and enabling the reception channel at the "answer received" state; and means for preparing the selection of the reception channel when the event flag is set to the "question received" state and the address contained in the input register is that associated with the reception channel, and for selecting the reception channel upon the next setting of the flag to the "question received" state.

According to an embodiment of the present invention, the circuit (receiver or transmitter circuit) includes a counter set to a predetermined value upon each setting of the flag to the "question received" state; and means for causing the effects of a setting of the flag to the "question received" state when the flag is not set to that state at the time when the counter has counted down the predetermined value.

According to an embodiment of the present invention, the addresses are transmitted in frames also including the setting value of the counter.

According to an embodiment of the present invention, the circuit includes a frame repeat flag set to a state authorizing address reception before the expiry of the down-counting of the counter, set to a state authorizing answer reception as soon as an address is received, and set to a state forbidding reception as soon as an answer is received.

A master circuit according to the present invention includes the flag settable to a "question transmitted" state, this state having the same cause and the same effects as a "question received" state and, further, arming a second trigger for enabling the output register and causing the loading of an address to be transmitted in the output register; and a counter setting the flag to a "period reached" state each time that it reaches a maximum value, this state firing the second trigger.

According to an embodiment of the present invention, the master circuit includes a buffer register storing the address contained in the input register when the flag is set to the "question transmitted" state; the output register receiving the content of the transmission channel when the flag is set to the "period reached" state and the address contained in the buffer register is that of the transmission channel; and a third trigger for enabling the output register, armed when the flag is set to the "period reached" state and the address contained in the buffer register is that of the transmission channel, and fired when the flag is set to the "question transmitted" state.

The foregoing and other objects, features and advantages of the present invention will be discussed in detail in the following non-limiting description of specific embodiments in relation with the accompanying drawings.

FIG. 1, previously described, shows an example of a FIP network;

Figure 6:
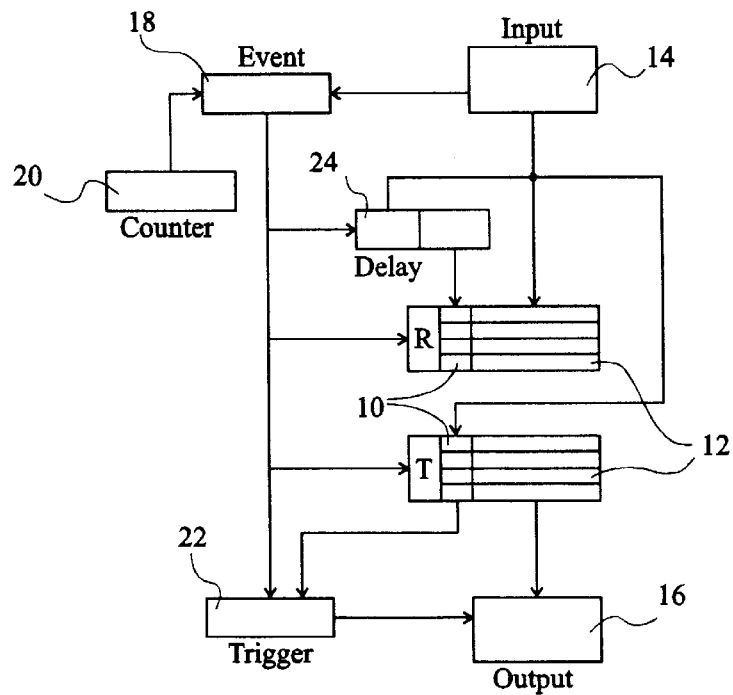
Figure 8A:
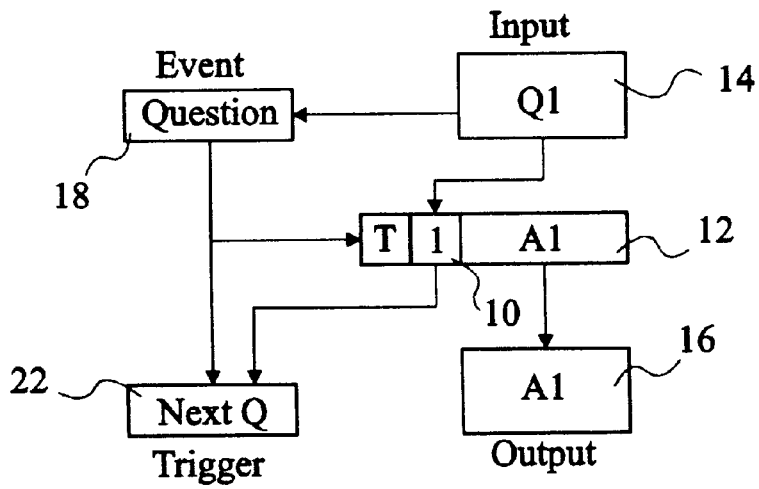
Figure 8B:
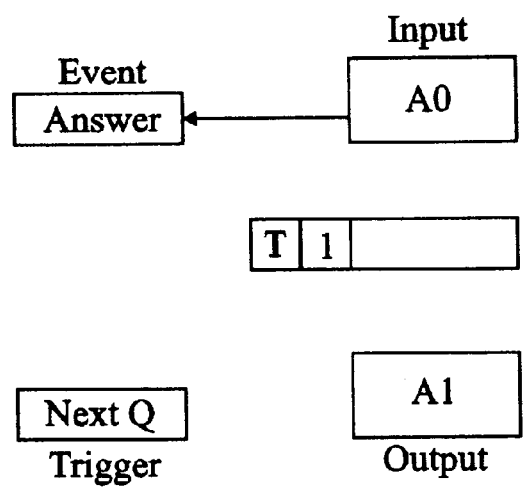
Figure 8C:
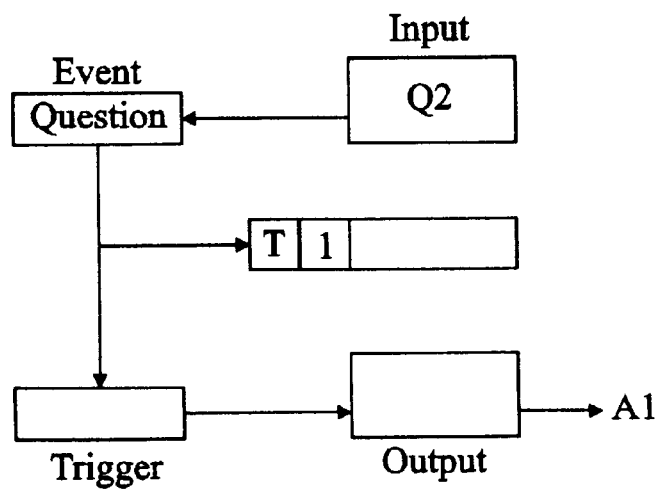

FIG. 6 schematically shows an embodiment of a node according to the present invention;

FIGS. 7A to 7D illustrate a mechanism of information reception by a node according to the present invention;

FIGS. 8A to 8C illustrate a mechanism of information transmission from a node according to the present invention; and FIGS. 9A to 9G illustrate the operation of a master node according to the present invention which can also transmit or receive information.

Figure 1:
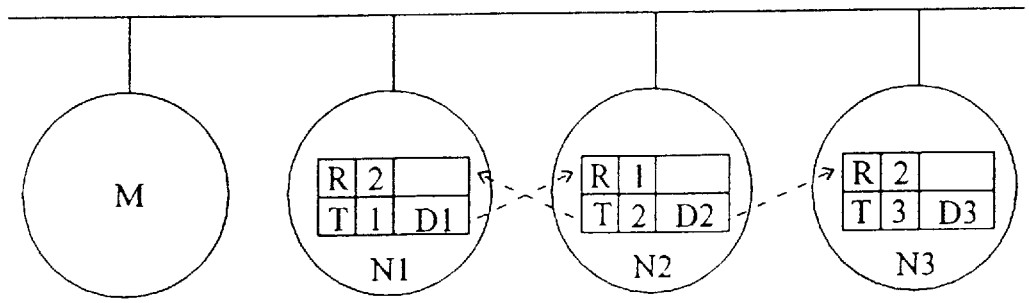

A network according to the present invention uses the "subscriber" technique of the conventional network of FIG. 1. However, the master node which, as the other nodes, has subscribers, is provided to periodically transmit questions so that each generator subscriber T is periodically questioned. Further, the information exchanged in the network (questions and answers) is transmitted in frames of fixed length.

Figure 2:
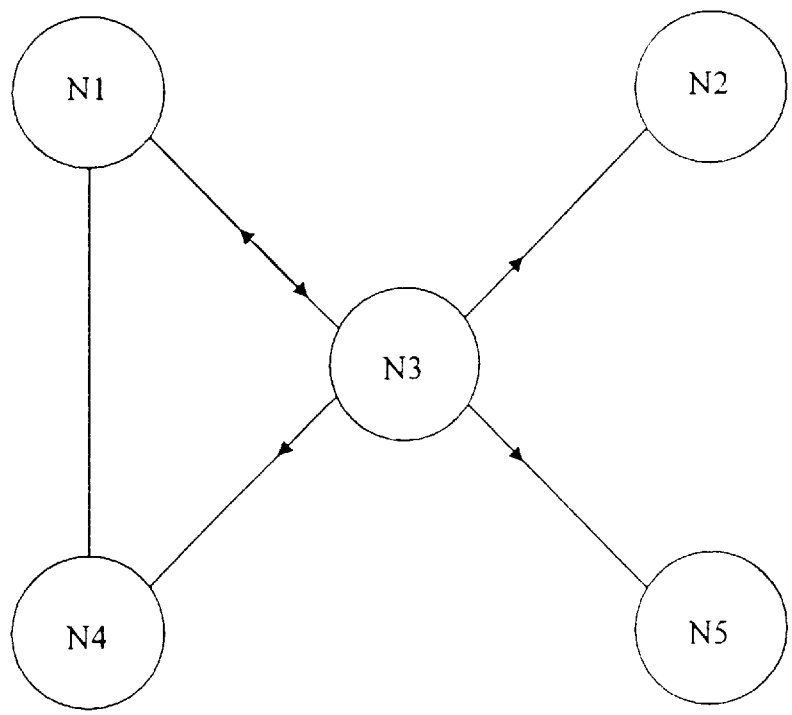
FIG. 2 shows a network using the flooding technique.
Figure 3:
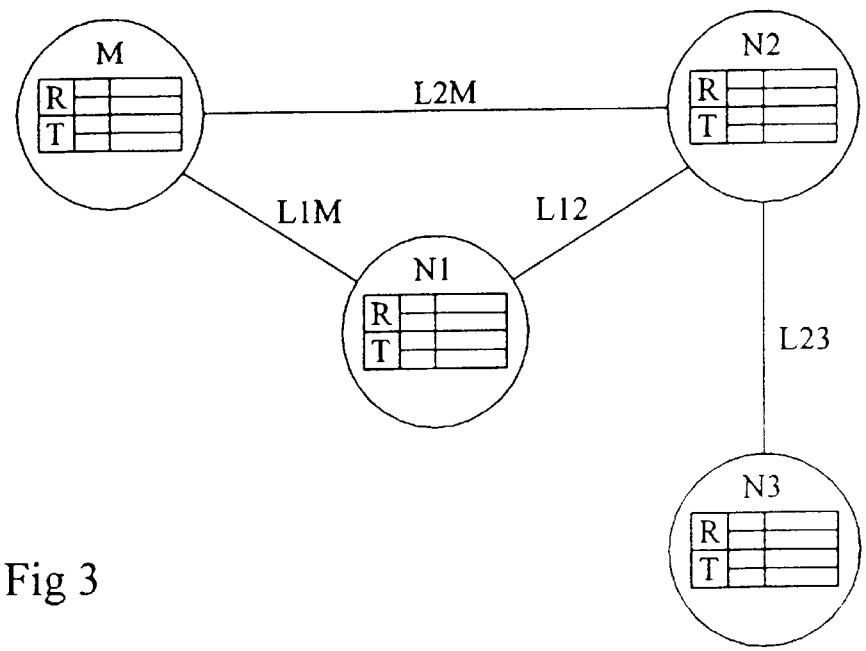
FIG. 3 shows an example of a network according to the present invention.

FIG. 3 shows an example of a network according to the present invention. In this example, the nodes are connected by point-to-point links and provided to operate according to the flooding technique (FIG. 2). The subscriber technique appears to be particularly well suited in combination with the flooding technique.

The possibility of transmitting images or sound is ensured by the fact that the answer frames have a constant length and are periodically transmitted (as answers to the periodical questions). The generation rates of the generator subscribers are generally constant, but can differ from one subscriber to another. In that case, it is easy to adapt the network to the different rates by questioning the fast generator subscribers more often than the slow ones.

FIG. 3 shows an example of a network according to the present invention. Nodes N1 and N2 are interconnected by a link L12 and connected to a master node M by respective links L1M and L2M A node N3 is connected to node N2 by a link L23. The links L are two-way point-to-point links. Each node, including master node M, has at least one consumer subscriber, or reception channel R, and/or at least one generator subscriber, or transmission channel T.

Figure 4:
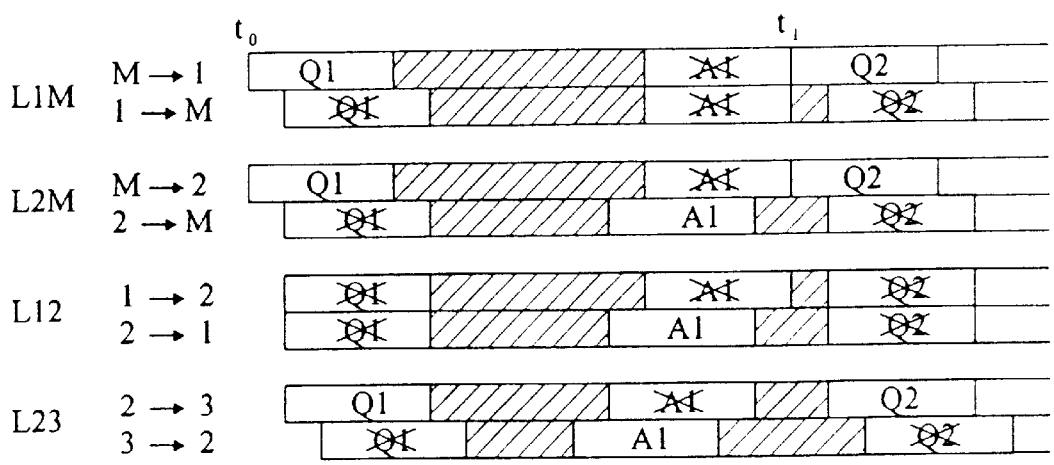
FIG. 4 shows an example of an occupation of the lines connecting the nodes in the network of FIG. 3.

FIG. 4 illustrates an example of an occupation of links L. For each link L, the occupation of each direction of the link is shown. The difference between a question frame and an answer frame appears in the first bits of the frame (for example, one starting bit followed by a bit which marks the difference between a question and an answer).

At a time t0, master node M transmits a question Q1 which simultaneously arrives at nodes N1 and N2 through link L1M and L2M. As soon as nodes N1 and N2 recognize that it is a first question, the question is repeated. Node N1 repeats question Q1 on lines L1M and L12 while node N2 repeats question Q1 on nodes L2M, L12 and L23. Thus, nodes M, N1, and N2 receive question Q1 for the second time. The question is then ignored, by a mechanism described later, which is shown by striked out question Q1. Node N3 receives question Q1 for the first time on line L23 and repeats it on this line. Node N2 then receives question Q1 for the third time and ignores it.

The answer A1 to question Q1 is contained in the transmission channel of node 3. Some time after receiving question Q1, node N3 transmits answer A1 on line L23 This latency time, required by node N3 to process question Q1, is substantially constant and can be of the order of magnitude of the transmission time of a frame.

Node N2 receives answer A1 for the first time and repeats it on lines L2M, L12, and L23. Answer A1 simultaneously arrives at nodes M, N1, and N3. Node N3, having transmitted the answer, ignores it. Nodes M and N1 repeat the answer on lines L1M, L2M, and L12. Nodes M, N1, and N2 simultaneously receive answer A1 for the second time and ignore it.

At a time t1, following time t0 by one period, master node M transmits a question Q2 which follows the same path as question Q1. To be sure to select an appropriate value of the question transmission period, this period is chosen to be at least equal to the sum of the time required for a question to cover the longest distance separating one node from the master node and of the time required for an answer to cover the longest distance separating the two most distant nodes. The longest distance between two nodes is measure by counting the maximum number of nodes between the two nodes by following the links L. This period thus depends on the line propagation time, on the repeating time of a question or an answer by a node, and on the latency time of a node to transmit an answer to a question.

The operating mode according to FIG. 4 is not optimal, since the network remains unused for an irreducible delay between the reception of a question and the transmission of the answer by a node.

Figure 5:
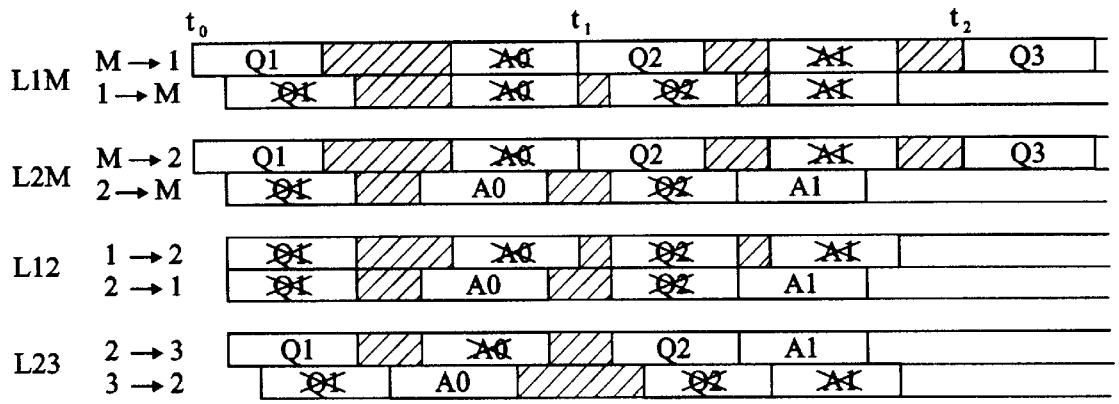
FIG. 5 illustrates an example of an occupation according to the present invention of the lines in the network of FIG. 3.

FIG. 5 shows, by means of an example, an optimization method according to the present invention of the network of FIG. 3. This optimization consists in an interlacing of the questions and answers on the network, that is, an answer to a question is transmitted only after receiving the next question. FIG. 5 illustrates an example of interlacing in the case of the network of FIG. 3.

At a time t0, master node M transmits a question Q1 which follows the same path as in FIG. 4. Node N2 contains an answer A1 to question Q1. However, when question Q1 reaches node N2, the latter does not transmit anything on the network but prepares to transmit answer A1 upon receiving the question Q2 to come. One period is given to node N2 for this preparation. This time is enough even for a software implementation of the mechanism, which reduces the hardware cost.

Node N3 has prepared answer A0 to the question preceding question Q1. As it receives question Q1, it transmits answer A0 just after repeating question Q1. Answer A0 reaches all nodes by following the path of answer A1 in FIG. 4.

At a time t1 following time t0 of a period reduced by one latency time with respect to that of FIG. 4, master node M transmits question Q2. This question follows the same path as question Q1. Node M2, which had prepared the transmission of answer A1 upon receiving question Q1, transmits this answer A1 just after repeating question Q2, and so on.

FIG. 6 schematically shows components of a network node according to the present invention enabling to obtain the interlacing of the questions and answers. The node includes at least one reception channel R and/or at least one transmission channel T. Each channel includes one address area 10 and one data area 12. The address areas 10 of the transmission channels contain, as previously mentioned, unified addresses, so that only one transmission channel answers a question. Conversely, the address areas 10 of the reception channels contain any transmission channel addresses that the user selects and programs to establish logic links between channels.

The data areas 12 of the reception channels are connected to an input register 14 in which is written the first question or the first answer arriving over the point-to-point links of the node. The data areas 12 of the transmission channels are connected to supply their content to an output register 16 which is itself designed to supply all point-to-point links of the node with its content.

The content of the data areas 12 of the reception channels is transmitted to receiver appliances, for example a display or a loudspeaker, or merely a switch. The content of the data areas 12 of the transmission channels is supplied by a transmitter appliance, for example a camera or a microphone, or merely a sensor.

The arrival of a frame in input register 14 sets an event flag 18. This flag 18 is set to a "question received" state when input register 14 has just received a question, and is set to an "answer received" state when input register 14 has just received an answer. A counter 20 can also act upon event flag 18. According to the state of the event flag, the accesses to the data areas 12 of the channels are enabled. Event flag 18 also acts to arm or fire a trigger 22 for enabling output register 16.

The addresses (the questions) arriving in input register 14 are compared with the addresses contained in the address areas 10. The identity between the address contained in input register 14 and that of a transmission channel T authorizes the arming of trigger 22. The identity between the address contained in input register 14 and the address of a reception channel R results in the storage of a signal for selecting this channel in a delay circuit 24. The effective selection of the reception channel will occur when the event flag is subsequently set to a predetermined state.

FIGS. 7A to 7D illustrate the operation of the structure of FIG. 6 upon receiving an answer for a reception channel of the node. These drawings only show the components of FIG. 6 actually used, that is, input register 14, an address reception channel 1, event flag 18 and delay circuit 24.

Figure 7A:
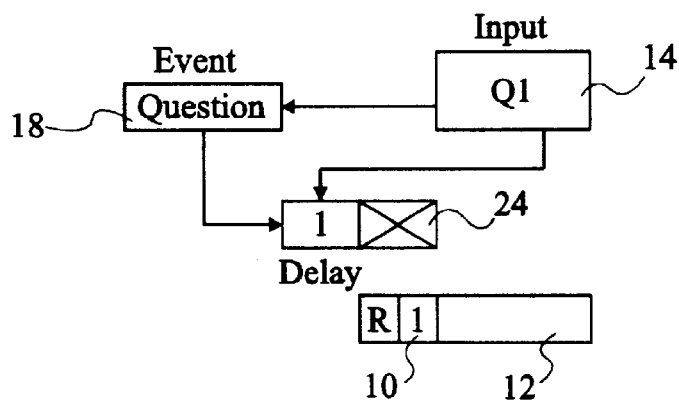

In FIG. 7A, input register 14 receives a question Q1 (address 1). Event flag 18 is set to the "question received" state. The setting to this state enables a shifting of delay circuit 24, the output of which has no effect here. Question Q1 corresponds to address 1 of the reception channel. This address (or a reception channel selection signal) is stored in delay circuit 24, but does not select the channel yet.

Figure 7B:
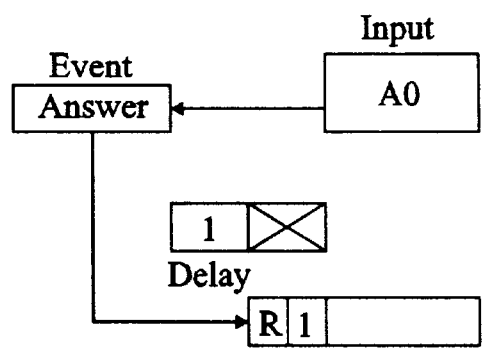

In FIG. 7B, an answer A0 arrives in input register 14. The arrival of this answer sets the event flag to the "answer received" state. This state enables reception channel R, but as this channel is not selected by the delay circuit, it does not take the content of the input register into account.

Figure 7C:
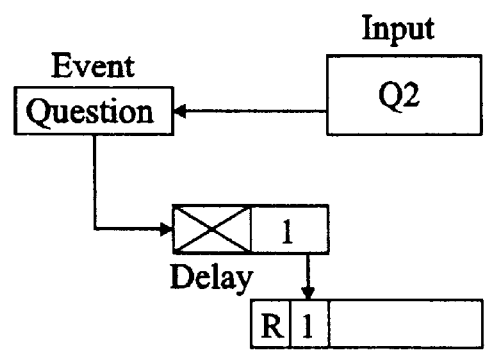

In FIG. 7C, a new question, Q2, arrives in the input register. The event flag is set to the "question received" state, which results in a shifting of the delay circuit. Shifted value 1 selects the reception channel, but this channel is not enabled and does not take the content of the input register into account.

Figure 7D:
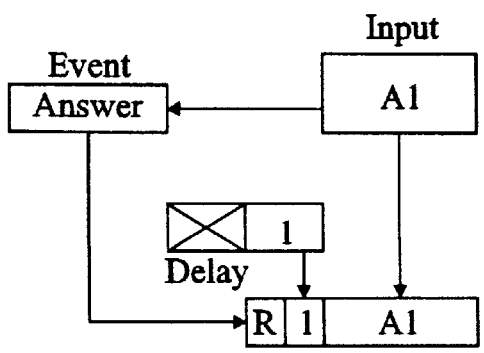

In FIG. 7D, the answer A1 to question Q1 arrives in the input register. The event flag is set to the "answer received" state, which enables the reception channel. This channel being still selected by the delay circuit takes the answer A1 contained in the input register into account.

FIGS. 8A to 8C illustrate the operation of the structure of FIG. 6 upon transmission of an answer to a question.

In FIG. 8A, input register 14 receives a question Q1, the address 1 of which corresponds to that of a transmission channel containing an answer A1. The transmission channel is selected by this address and enabled by the setting of event flag 18 to the "question received" state; answer A1 is transferred to output register 16, but is not yet transmitted. The setting of the event flag to the "question received" state arms trigger 22 so that it is fired upon receiving the next question. This arming is authorized by the fact that the address contained in input register 14 corresponds to the address of the transmission channel.

In FIG. 8B, an answer A0 to a preceding question is received in the reception register. The event flag is set to the "answer received" state. No other event occurs.

In FIG. 8C, the reception register receives a question Q2 The event flag is set to the "question received" state, which fires the trigger. The firing of the trigger causes the transmission of the content A1 of the output register. The event flag enables the transmission channel, but this channel does not supply its content to the output register since it is not selected by the address contained in the input register.

Both the reception and transmission mechanisms just described operate perfectly well if each question effectively reaches the node.

However, should a question not arrive, for example due to a disturbance in a link resulting in the loss of the question, two problems arise. A first problem is that, if the node has prepared an answer to the preceding question, this answer will be transmitted after the next question, that is, at a wrong time when another node could transmit the answer to the lost question. A second problem is that, if the node is waiting for an answer to the preceding question, this answer would be ignored by the node which would only take into account the answer transmitted after the next question, which is in principle that of the lost question.

To avoid such disadvantages, the present invention provides that a node waits for a question for a time slightly greater than one period, and then acts as if the question had been received, even if it has not been received. For this purpose, counter 20 of FIG. 6 is set to a value slightly higher than one period for each setting to the "question received" state of the event flag. If the event flag is not set back to the "question received" state at the time when the counter reaches its programmed value, the counter itself sets the event flag to the "question received" state and resets. The node then acts exactly as if it had received a question which does not concern it, and will take into account the next answer which is directed thereto or else transmit an answer which is waiting in the output register.

Instead of being lost, a question may be delayed, for example because a link was broken or because the period of question transmission by the master node has increased. With the above-described mechanism, the delayed question is ignored, which is not desirable if the situation is durable. To avoid this, each node is provided to detect the delayed question and enable the node to accept a delayed question if the situation occurs a number of times. Then, in the case of a change of period, the value to which counter 20 is set should be adjustable. For this purpose, each question frame transmitted by the master node contains the value used for resetting the counter. This results in significant network flexibility, since period modifications due to topographic network modifications (addition or removal of a node) may then be programmed, which enables an optimization of the network for each situation.

In order to not take into account (by repeating and eventually processing) a same frame more than once, the following mechanism is used. At a time just before the expiring of a period, for example a few cycles before counter 20 has counted one period, a frame repeat flag (not shown) is set to a "question reception" state. This state only authorizes the node to take into account the first question which reaches it.

When this question is received, it is retransmitted at once and the repeat flag is set to an "answer reception" state which only authorizes the node to take into account the first answer which reaches it.

When this answer is received, it is retransmitted at once and the repeat flag is set to a "blocked" state which forbids the node to take into account the frames which reach it, until the resetting to the "question reception" state as the period expires.

As mentioned previously, a master node can also receive or transmit answers. It transmits or receives the answers to its own questions.

FIGS. 9A to 9G illustrate the answer reception and transmission mechanism of a master node.

Figure 9A:
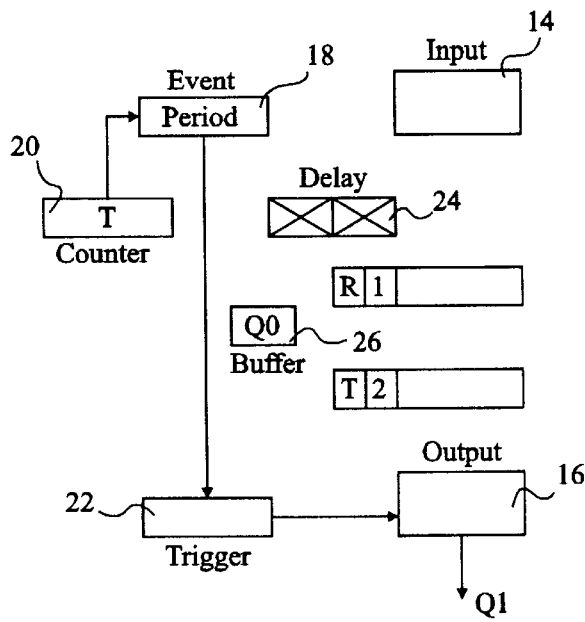

In FIG. 9A, counter 20, previously set with a period T, has counted down the period. Event flag 18 is set to a "period reached" state. This "period reached" state fires trigger 22 to transmit the content, a question Q1, of output register 16. A buffer register 26 stores the previously transmitted question Q0, or at least an identifier of this question.

Figure 9B:
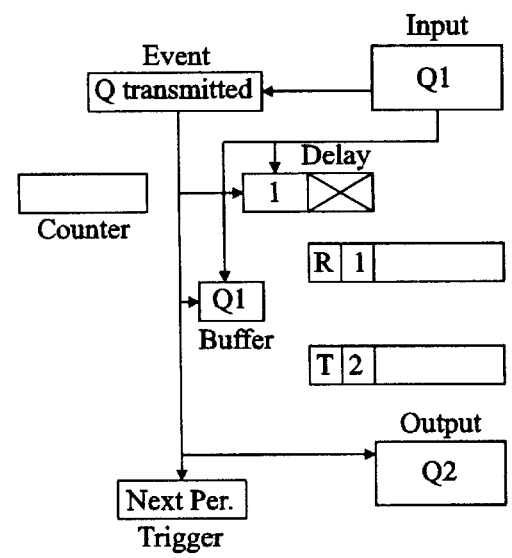

In FIG. 9B, the input register receives question Q1 (or simulates its reception) transmitted by the output register. The event flag is set to a "question transmitted" state which has the same effect as the "question received" state upon delay circuit 24. This delay circuit stores the address 1 of the question contained in the input register which corresponds to a reception channel. The "question transmitted" state arms the trigger to trigger the transmission of the content of the output register upon the next setting to the "period reached" state of the event flag Meanwhile, the "question transmitted" state causes the loading into the output register of the next question Q2 to be transmitted and of the question Q1 of the input register into the buffer register.

At an unshown step identical to that of FIG. 7B, the input register receives an answer which does not concern the node.

Figure 9C:
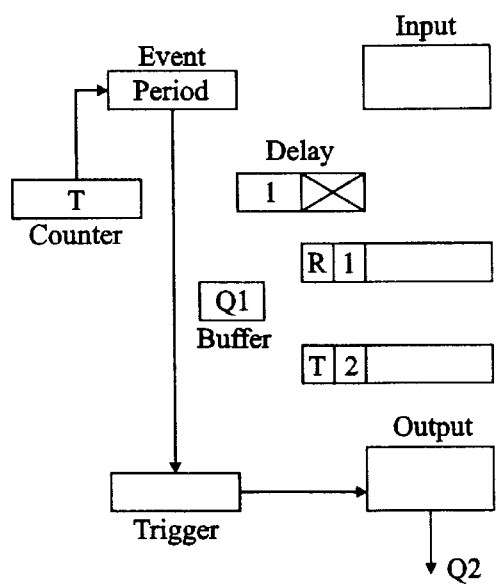

In FIG. 9C, the counter has counted down the period and the event flag is set to the "period reached" state, which fires the trigger to transmit the question Q2 contained in the output register.

Figure 9D:
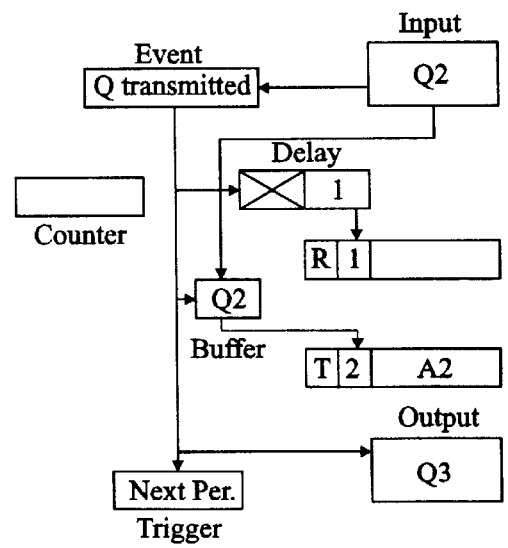

In FIG. 9D, question Q2 is received in the input register, which sets the event flag to the "question transmitted" state. The content of the delay circuit is shifted and address 1 now selects the reception channel which is not yet enabled. The buffer register receives the content Q2 of the input register. The address of transmission channel T corresponds to that contained in the buffer register; the channel is selected but not yet enabled. The trigger is armed to trigger the transmission of the content of the output register, now Q3, at the next period.

Figure 9E:
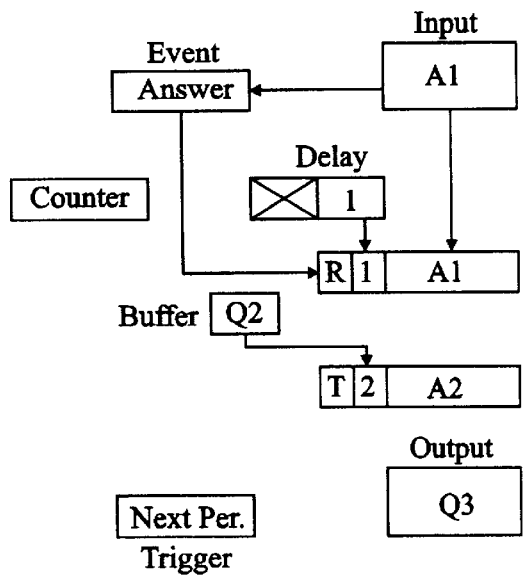

In FIG. 9E, the input register receives answer A1 to question Q1. This step corresponds to that of FIG. 7D. Besides, transmission channel T is still selected by the buffer register, but is not enabled.

Figure 9F:
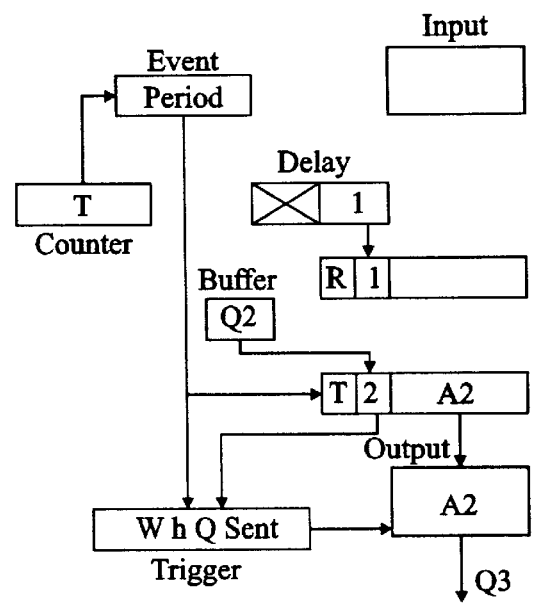

In FIG. 9F, a new period is reached. The event flag is set to the "period reached" state, which fires the trigger to transmit the question Q3 contained in the output register. Meanwhile, transmission channel T is enabled and its content, answer A2, is transferred to the output register. In this particular case, the trigger is armed to be fired upon the next setting of the event flag to the "question transmitted" state.

Figure 9G:
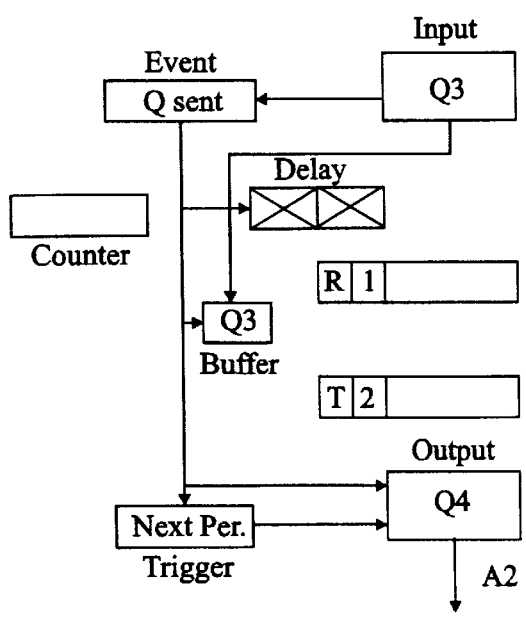

In FIG. 9G, question Q3 is received in the reception register, the event flag is set to the "question transmitted"

state, which fires the trigger to transmit the content A2 of the output buffer. Simultaneously, a new question Q4 is loaded in the output register and the question Q3 of the input register is copied into the buffer register.

The present invention has been described by means of point-to-point links which make the network tolerant to line interruptions Of course, the present invention also applies to a bus. It can even be devised that the nodes have both point-to-point links and bus links.

I claim:

1. A method for exchanging information frames having a constant length on a network between circuits (M, N) having transmission channels (T) of unified addresses and/or reception channels (R) associated with addresses of transmission channels, including the steps of:

periodically transmitting from a master circuit (M) addresses (Q) of transmission channels, so that the address of each transmission channel is periodically transmitted;

receiving each address by each circuit (M, N) and, when the address corresponds to a transmission channel of the circuit, transmitting the information frame contained in the transmission channel after receiving the next address;

receiving each information frame by each circuit and, when the address previously received by the circuit is associated with a reception channel of the circuit, providing the received frame to this reception channel after receiving the next address; and retransmitting from each circuit each first address received and each first information frame received.

2. A method according to claim 1, wherein each circuit, at the time when it should be receiving an address which does not arrive, when necessary, transmits the information frame contained in the transmission channel corresponding to the last address received, or provides the received frame to the reception channel associated with the last address received.

3. A circuit for connection to a network, including at least one address transmission channel (T) having an address such that the addresses of the transmission channels of the circuits connected to the network are unified, and including:

an input register (14) for periodically receiving addresses (Q) transmitted over the network by a master circuit (M) and frames (A) transmitted over the network as answers to these addresses;

an event flag (18) set to a "question received" state at the time when an address is received in the input register;

an output register (16) receiving the content of the transmission channel when the flag is in the "question received" state and the address contained in the input register is that of the transmission channel; and a trigger (22) for transmitting the content of the output register, a when the flag is set to the "question received" state and the address contained in the input register is that of the transmission channel, this trigger being fired and reset by a new setting of the flag at the "question received" state.

4. A circuit for connection to a network, including at least one reception channel (R) associated with an address of a transmission channel (T), and including:

an input register (14) for periodically receiving addresses (Q) transmitted over the network by a master circuit (M) and frames (A) transmitted over the network as answers to these addresses;

the reception channel connected to the input register to receive the content of the input register when it is both selected and enabled;

an event flag (18) set to a "question received" state at the time when an address is received in the input register, set to an "answer received" state at the time when a frame is received in the input register, and enabling the reception channel at the "answer received" state; and means (24) for preparing the selection of the reception channel when the event flag is set to the "question received" state and the address contained in the input register is that associated with the reception channel, and for selecting the reception channel upon the next setting of the flag to the "question received" state.

5. A circuit according to claim 3 or 4, including:

a counter (20) set to a predetermined value upon each setting of the flag to the "question received" state; and means for causing the effects of a setting of the flag to the "question received" state when the flag is not set to that state at the time when the counter has counted down the predetermined value.

6. A circuit according to claim 5 wherein the addresses are transmitted in frames also including the setting value of the counter (20).

7. A circuit according to claim 5, including a frame repeat flag set to a state authorizing address reception before the expiry of the down-counting of the counter (20), set to a state authorizing answer reception as soon as an address is received, and set to a state forbidding reception as soon as an answer is received.

8. A master circuit according to claim 3 or 4, including:

the flag (18) settable to a "question transmitted" state, this state having the same cause and the same effects as a "question received" state and, further, arming a second trigger (22) for enabling the output register (16) and causing the loading of an address to be transmitted in the output register; and a counter (20) setting the flag to a "period reached" state each time that it reaches a maximum value, this state firing the second trigger.

9. A master circuit according to claim 8, including:

a buffer register (26) storing the address contained in the input register (14) when the flag is set to the "question transmitted" state;

the output register (16) receiving the content of the transmission channel when the flag is set to the "period reached" state and the address contained in the buffer register is that of the transmission channel; and a third trigger (22) for enabling the output register, armed when the flag is set to the "period reached" state and the address contained in the buffer register is that of the transmission channel, and fired when the flag is set to the "question transmitted" state.

* * * * *